UNITED STATES PATENT OFFICE.

ERNST NEUER, OF ROCK SPRING, MISSOURI.

IMPROVEMENT IN THE PROCESSES OF MANUFACTURING GLUE.

Specification forming part of Letters Patent No. 149,673, dated April 14, 1874; application filed March 27, 1874.

*To all whom it may concern:*

Be it known that I, ERNST NEUER, of Rock Spring, in the county of St. Louis and State of Missouri, have invented certain new and useful Improvements in Process for Manufacturing Glue, and Rendering or Extraction of Fat; and I do hereby declare the following to be a full, clear, and exact description thereof, which will enable others skilled in the art to use the same.

The nature of my invention consists in a process for manufacturing glue, and rendering or extracting fat, without the use of water, by boiling, steaming, or rendering with high-pressure steam led into a closed vessel containing the material, the steam to be discharged therein freely from one to two feet above the bottom of the vessel, as will be hereinafter more fully set forth.

The steam is derived from an ordinary boiler, and conveyed into the vessel filled with the material, such vessel being of a size to suit the extent of the business, the steam-pipe leading from the top downward into the same. This tank is to be provided with a suitable man-hole and cover at the top for filling, and with another on the side from six to twelve inches above the bottom for discharging. It is further provided with an interior perforated false bottom immediately below the discharge-hole; also, with two or more stop-cocks and a safety-valve.

The material of which the tank is constructed may be boiler-iron, the heads being connected by a central rod fastened with nuts. The tank may be made of sheet-copper or white-oak staves, in which latter case the new vessel must be washed and steamed out several times, to extract the tannin from the wood.

The materials to be worked upon by my process are as follows: The ordinary glue-stock, such as hide-scraps, fresh and wet or dried, damaged or not, and pieces of hides, which are first sufficiently soaked in lime-water, and thoroughly washed in clean water. The tank is then completely filled with this material without the addition of any water.

The filled tank is closed, and steam let in for about fifteen minutes, when the condensed water is run off, and the tap closed again. The safety-valve is now set for twenty-five pounds pressure to the square inch, and when steam begins to blow off from it, the melted gelatinous matter is tapped off continually, until the material in the tank is exhausted, which is shown by the liquid becoming too thin and watery for use. The gelatinous mass obtained is then immediately more concentrated in an open flat pan, somewhat smaller in capacity than the tank, which pan is provided with iron steam-pipes laid on the bottom, with two or three entrance and discharge valves, to obtain a rapid boiling and concentration of the mass, during which the foam or scum and impurities arising to the surface are skimmed off. The liquid will soon become clear, and of sufficient consistency to be drawn off into coolers, or into a settling-vessel first.

For the same purpose, heads and feet of fresh-killed cattle, also feet of calves, heifers, hogs, and all other fresh clean animal offal or matter; also, small fresh bones containing and with adhering gelatinous matter, are well washed with clear water, put into the steam-tank and treated as above, with the same result, besides obtaining the fat contained in the raw material, which gathers on the surface of the evaporation-pan, and is taken off when boiling sets in.

The first and second kinds of materials may be used together in suitable proportions, according to the quality of the article desired, with the same result.

Rough tallow is rendered in the same manner, without water, keeping the steam-pressure at twenty-five pounds for one or two hours, while whatever gelatinous matter present, along with a part of the tallow, is obtained, and then raising the pressure to sixty or seventy-five pounds, so as to dissolve the last drop of fat in the tank.

Hogs or parts thereof are rendered or treated in like manner for lard, and dead animals or other fatty material for grease.

By this process, time and fuel are saved, and a better product in either of its applications is obtained.

Having thus fully described my invention, what I claim as new, and desire to secure by Letters Patent, is—

The within-described process for manufacturing glue and rendering or extracting fat by steam under pressure, and without the use of water, substantially as herein set forth.

In testimony that I claim the foregoing I have hereunto set my hand this 21st day of March, 1874.

ERNST NEUER.

In presence of—
   CHAS. C. REUSS,
   GEO. LANG,
   GEO. H. BRANN.